US011788008B2

(12) United States Patent
Gleeson et al.

(10) Patent No.: US 11,788,008 B2
(45) Date of Patent: Oct. 17, 2023

(54) ALIGNED NEMATIC ELASTOMER

(71) Applicant: University of Leeds, Leeds (GB)

(72) Inventors: Helen Frances Gleeson, Leeds (GB); Devesh Arvind Mistry, Leeds (GB)

(73) Assignee: University of Leeds, Leeds (GB)

( * ) Notice: Subject to any disclaimer, the term of this patent is extended or adjusted under 35 U.S.C. 154(b) by 2 days.

(21) Appl. No.: 17/655,710

(22) Filed: Mar. 21, 2022

(65) Prior Publication Data

US 2022/0204849 A1 Jun. 30, 2022

Related U.S. Application Data

(63) Continuation of application No. 16/756,809, filed as application No. PCT/GB2018/053018 on Oct. 18, 2018, now abandoned.

(30) Foreign Application Priority Data

Oct. 19, 2017 (GB) ..................................... 1717174

(51) Int. Cl.
| | | |
|---|---|---|
| *G02F 1/1333* | (2006.01) | |
| *C09K 19/12* | (2006.01) | |
| *C09K 19/30* | (2006.01) | |
| *C09K 19/54* | (2006.01) | |

(52) U.S. Cl.
CPC .......... *C09K 19/12* (2013.01); *C09K 19/3003* (2013.01); *C09K 19/542* (2013.01); *C09K 2019/122* (2013.01); *C09K 2019/3004* (2013.01); *C09K 2019/3009* (2013.01); *C09K 2019/548* (2013.01)

(58) Field of Classification Search
CPC .... C09K 19/12; C09K 19/3003; C09K 19/54; C09K 19/542; C09K 2019/122; C09K 2019/3004; C09K 2019/3009; C09K 2019/548; C09K 2019/0448; C09K 2019/38; C09K 2019/3804
See application file for complete search history.

(56) References Cited

U.S. PATENT DOCUMENTS

| | | |
|---|---|---|
| 6,669,865 B1 | 12/2003 | Coates et al. |
| 2015/0138460 A1 | 5/2015 | Sugiyama et al. |
| 2020/0239774 A1 | 7/2020 | Gleeson et al. |
| 2022/0204849 A1* | 6/2022 | Gleeson ................ C09K 19/54 |

FOREIGN PATENT DOCUMENTS

| | | |
|---|---|---|
| JP | 2006-215287 A | 8/2006 |
| JP | 4271729 B2 | 3/2009 |
| WO | 1997/035219 A1 | 9/1997 |
| WO | WO 1997/035219 A1 | 9/1997 |

OTHER PUBLICATIONS

Alderson, A. and Evans, K.E., "Modelling concurrent deformation mechanisms in auxetic microporous polymers," Journal of Materials Science, vol. 32; 2797-2809 (1997).
Alderson, A. and Alderson, K.L., "Auxetic materials," J. Aerospace Engineerings, Proc. IMechE, vol. 221; Part G; 565-575 (2007).
Aldred, P. and Moratti, S.C., "Dynamic simulations of potentially auxetic liquid-crystalline polymers incorporating swiveling mesogens," Molecular Simulation, vol. 31; No. 13; 883-887 (2005).
Bhullar, S.K., "Three decades of auxetic polymers: a review," e-Polymers, vol. 15; No. 4; 205-215 (2015).
Caddock, B.D. and Evans, K.E., "Microporous materials with negative Poisson's ratios: I. Microstructure and mechanical properties," J. Phys. D. Appl. Phys, vol. 22; 1877-1882 (1989).
Dey, S. et al., "Soft Elasticity in Main Chain Liquid Crystal Elastomers," Crystals, vol. 3; 363-390 (2013).
Evans, K.E. and Alderson, A., "Auxetic Materials: Functional Materials and Structures from Lateral Thinking," Advanced Materials, vol. 12; No. 9; 617-628 (2000).
Gaspar, N. et al., "Auxetic behavior and anisotropic heterogeneity," Acta Materialia, vol. 57; 875-880 (2009).
Grima, J.N. et al., "Molecular-Level Deformations in Auxetic Organic Networked Polymers," American Chemical Society, Chapter 13; 197-214 (2010).
He, C. et al., "Toward Negative Poisson Ratio Polymers through Molecular Design," Macromolecules, vol. 31; 3145-3147 (1998).
He, C. et al., "Morphology and Deformation Behaviour of a Liquid Crystalline Polymer Containing Laterally Attached Pentaphenyl Rods," Macromol. Chem. Phys., vol. 206; 233-239 (2005).
He, C. et al., "Toward molecular auxetics: Main chain liquid crystalline polymers consisting of laterally attached para-quaterphenyls," Phys. Stat. Sol., vol. 242; No. 3; 576-584 (2005).
Higaki, H. et al., Nonuniform and Uniform Deformations of Stretched Nematic Elastomers, Macromolecules, vol. 46; 5223-5231 (2013).
Huang, C. and Chen, L., "Negative Poisson's Ratio in Modern Functional Materials," Advanced Materials, vol. 28; 8079-8096 (2016).
Kolken, H.M.A. and Zadpoor, A.A., "Auxetic mechanical metamaterials," RSC Adv., vol. 7; 5111-5129 (2017).
Liu, Y. and Hu, H., "A review on auxetic structures and polymeric materials," Scientific Research and Essays, vol. 5; No. 10; 1052-1063 (2010).
Miller, W. et al., "The manufacture and characterization of a novel, low modulus, negative Poisson's ratio composite," Composites Science and Technology. Vo. 69; 651-655 (2009).
Mir, M. et al., "Review of Mechanics and Applications of Auxetic Structures," Advances in Materials Science and Engineering, vol. 2014; Article ID 753496; 17 pages (2014).
Mistry, D. et al., "New insights into the nature of semi-soft elasticity and "mechanical-Fréedericksz transitions" in liquid crystal elastomers," Soft Matter, vol. 14; 1301-1310 (2018).
Mitchell, G.R. et al., "Strain-Induced Transitions in Liquid-Crystal Elastomers," Physical Review Letters, vol. 71; No. 18; 2947-2950 (1993).

(Continued)

*Primary Examiner* — Geraldina Visconti
(74) *Attorney, Agent, or Firm* — Hamilton, Brook, Smith & Reynolds, P.C.

(57) ABSTRACT

There is provided the use of an aligned nematic elastomer to form a material having auxetic properties wherein the aligned nematic material has a mechanical Fréedericksz transition. Also provided is a method of producing an aligned nematic elastomer for said use.

12 Claims, 5 Drawing Sheets

(56) References Cited

OTHER PUBLICATIONS

Palagi, S. et al., "Structured light enables biomimetic swimming and versatile locomotion of photoresponsive soft microrobots," Nature Materials, vol. 15; 647-654 (2016).

Peura, M. et al., "Negative Poisson Ratio of Crystalline Cellulose in Kraft Cooked Norway Spruce," Biomacromolecules, vol. 7; 1521-1528 (2006).

Pour, N. et al., "Auxetics at the Molecular Level: A Negative Poisson's Ratio in Molecular Rods," Molecular Mechanics, Angew. Chem. Int. Ed., vol. 45; 5981-5983 (2006).

Ravirala, N. et al., "Auxetic Polypropylene Films," Polym. Eng. Sci., vol. 45; 517-528 (2005).

Ren, W. et al., "Stress-strain behavior in main chain liquid crystalline elastomers: effect of crosslinking density and transverse rod incorporation on "Poisson's ratio"," Phys. Status Solidi B., vol. 246; No. 9; 2124-2130 (2009).

Roberts, P.M.S. et al., "A Single Director Switching Mode for Monodomain Liquid Crystals Elastomers," J. Phys. II France, vol. 7; 1337-1351 (1997).

Roberts, P.M.S. et al., "Mechanical Switching and Soft Elasticity in Liquid Crystal Elastomers," Mol. Cryst. Liq. Cryst., vol. 299; 181-186 (1997).

Saxena, K.K. et al., "Three Decades of Auxetics Research—Materials with Negative Posson's Ratio: A Review," Advanced Eng. Materials, vol. 18; No. 11; 1847-1870 (2016).

Smith, C.W. et al., "Interpretation of Experimental Data for Poisson's Ratio of Highly Nonlinear Materials," Experimental Mechanics, vol. 39; No. 4; 356-362 (1999).

Urayama, K. et al., "Stretching-Induced Director Rotation in Thin Films of Liquid Crystal Elastomers with Homeotropic Alignment," Macromolecules, vol. 40; 7665-7670 (2007).

Ware, T.H. et al., "Voxelated liquid crystal elastomers," Science, vol. 347; Issue 6225; 982-984 (2015).

Wei, G., "Design of auxetic polymer self-assemblies," Phys. Stat. Sol., vol. 242; No. 3; 742-748 (2005).

International Search Report and Written Opinion for International Application No. PCT/GB2018/053018, entitled: "Aligned Nematic Elastomer," dated Mar. 6, 2019.

Non-Final Office Action for U.S. Appl. No. 16/756,809, dated Oct. 22, 2021.

International Preliminary Report on Patentability for International Application No. PCT/GB2018/053018, entitled: "Aligned Nematic Elastomer," dated Apr. 30, 2020.

* cited by examiner

ALIGNED NEMATIC ELASTOMER

RELATED APPLICATION(S)

This application is a Continuation of U.S. patent application Ser. No. 16/756,809, filed Oct. 18, 2018, which is the U.S. National Stage of International Application No. PCT/GB2018/053018, filed Oct. 18, 2018, which designates the U.S., published in English, and claims priority under 35 U.S.C. § 119 or 365(c) to GB Application No. 1717174.5, filed Oct. 19, 2017. The entire teachings of the above applications are incorporated herein by reference.

BACKGROUND

The present invention relates to the use of an aligned nematic elastomer, in particular to its use in forming material having auxetic properties.

In conventional materials, when the material is stretched, the material simultaneously becomes thinner in cross-section. Similarly, if a conventional material is compressed, the material expands laterally. These conventionally behaved materials have a positive Poisson's ratio where the Poisson's ratio is described as the negative ratio of the proportional decrease in a lateral measurement to the proportional increase in length in a sample of material that is elastically stretched. Materials with auxetic properties on the other hand have a negative Poisson's ratio. On stretching, the materials become thicker in one or both of the directions perpendicular to the applied force. Auxetic materials are of particular interest because of this unusual behaviour under deformation. Auxetic materials exist in nature, for example some minerals and a large number of cubic elemental metals, but synthetic auxetic materials were only developed in the 1980s. Macroscopic auxetic behaviour has been used in multiple applications from sportswear to space travel. The design and synthesis of molecular auxetic materials is a particularly exciting prospect. However synthetic molecular auxetic materials have not yet been developed.

Liquid crystals have long range order and through varying the components that give the liquid crystals their desired properties, the physical properties of the resulting materials can be fine-tuned. It has therefore been suggested that liquid crystal polymers may be developed which display auxetic properties. However, to date no such material has been reported.

The applicant has surprisingly developed a self assembled nematic material having auxetic properties.

In a first embodiment there is provided the use of an aligned nematic elastomer to form a material having auxetic properties wherein the aligned nematic material has a mechanical Fréedericksz transition (MFT).

It has surprisingly been found that by forming an aligned nematic elastomer which displays an MFT the resulting material has auxetic properties and therefore has use in a wide range of novel applications. Because the materials have auxetic properties, they demonstrate improved shock absorbance and shear performance. These properties are useful in multiple applications. For example in aerospace, automotive, defence and sports applications as well as in biomedical fields where materials having auxetic properties can be used to mimic biological systems. Use in medical devices such as stents and valves and blood vessel dilators, where controlled expansions and contraction using external stimuli are important, is envisaged, as well as in prosthetic materials and surgical implants where reaction to external pressures is of particular use. The materials may also find use in medical attachment means such as sutures and anchors or for controlled release of active pharmaceutical ingredients through controlled contraction or expansion.

Materials displaying auxetic properties may also find application in piezoelectric sensors and actuators, as well as in micro- and nano-mechanical and electromechanical devices. Other potential uses include in composite materials where the materials displaying auxetic properties could act as reinforcements, or in personal protection clothing such as crash helmets, body armour, and sports clothing where expansion in response to external forces is clearly desirable.

Figure 1:
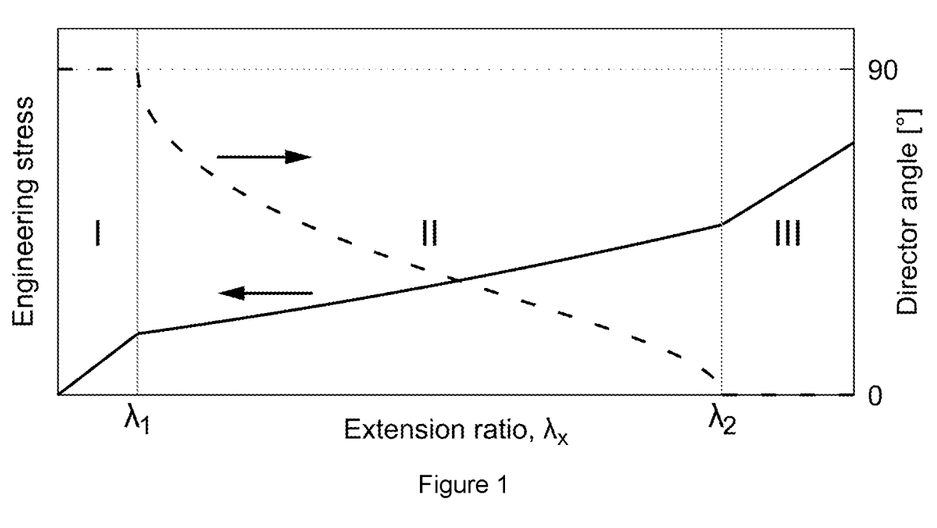
FIG. 1 shows a theoretical plot of extension ratio vs stress for a material showing an SSE transition.
Figure 2A:
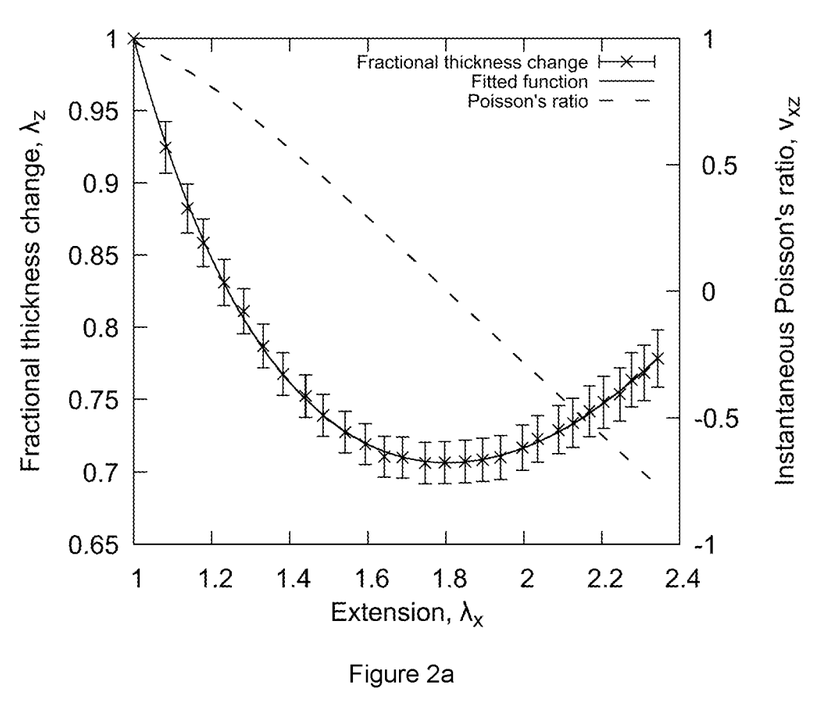
FIGS. 2a, 2b, 2c and 2d show plots of the fractional thickness vs the extension ratio and the Poisson's ratio vs the extension ratio of the materials of examples 1 to 4 respectively. Sub-zero values of the Poisson's ratio indicate the auxetic behaviour.
Figure 2B:
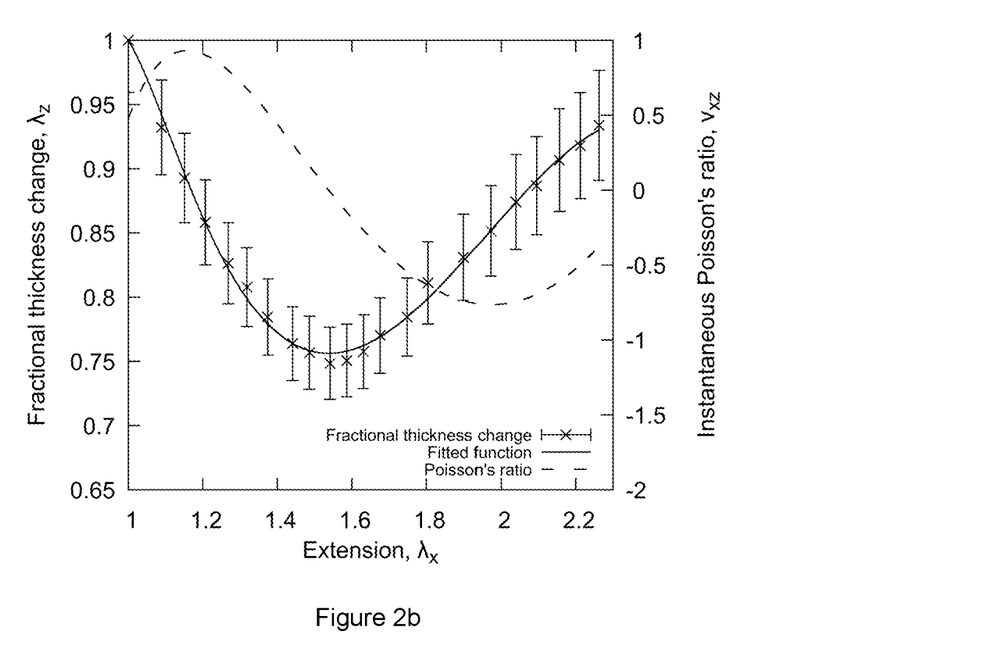
Figure 2C:
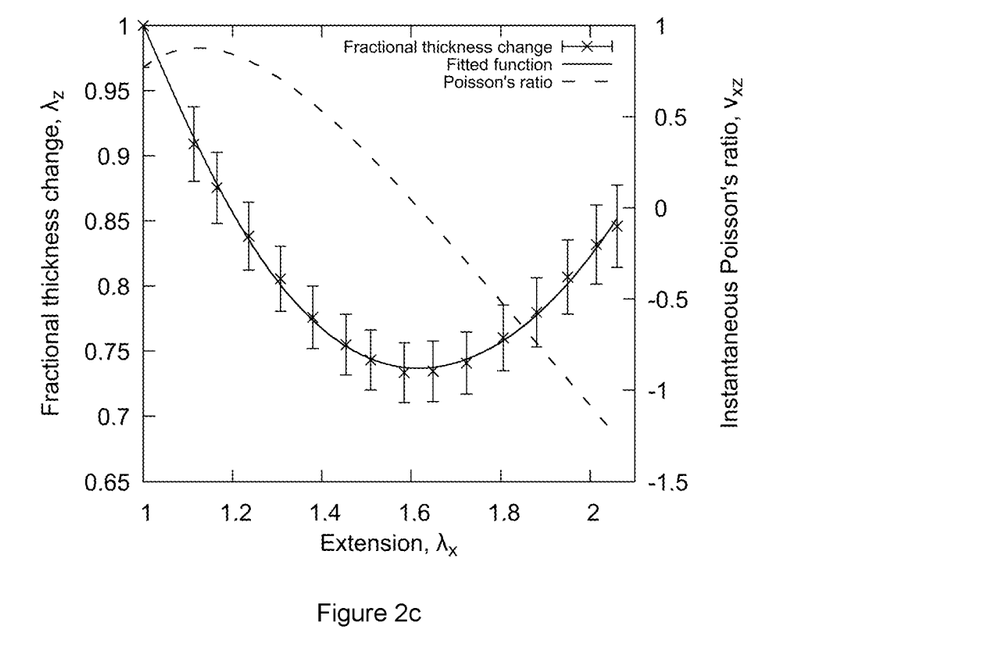
Figure 2D:
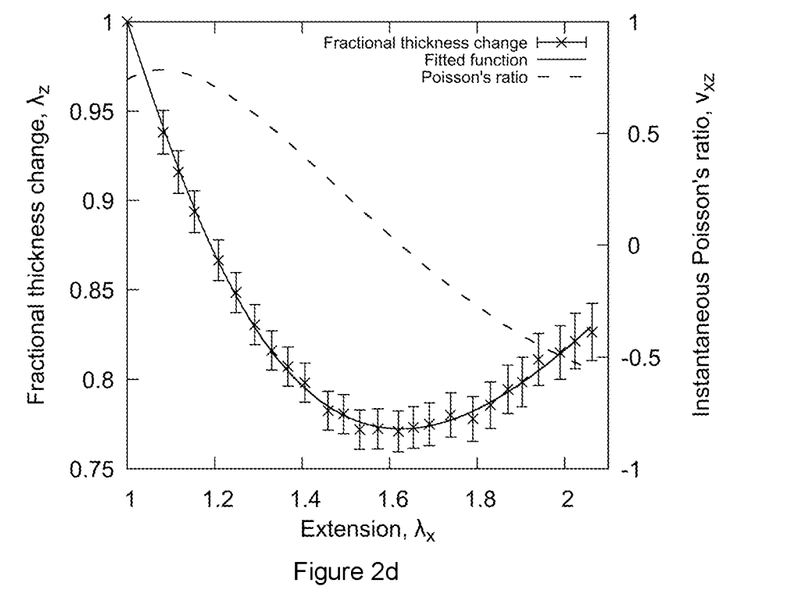

A mechanical Fréedericksz transition is defined as a deformation mode of an aligned elastomer wherein the director within the elastomer rotates sharply at a critical strain to reorient towards the direction parallel to the stress axis at a critical extension. Materials displaying this property were first described by Mitchell et al (Mitchell, G. R., Davis, F. J. and Guo, W., *Phys. Rev. Lett.*, 1993, 71(18), 2947) and Roberts et al (Roberts, P. M. S., Mitchell, G. R and Davis, F. J., *J. Phys, II France*, 1997, 7, 1337 and Roberts, P. M. S., Mitchell, G. R, Davis, F. J. and Pople, J. A., *Mol. Cryst. Liq. Cryst.*, 1997, 299, 181). An MFT is often described in analogy to the well-known electric (or magnetic) field Fréedericksz transitions (EFT) that occur in low molar mass nematic display devices. In the EFT, the director reorients sharply beyond a well-defined critical field (or voltage), becoming increasingly aligned with respect to the electric field as the amplitude of the field is increased. The EFT threshold is discontinuous in theory, but is known to be softened if an ideal LC monodomain with alignment exactly parallel or perpendicular to the substrates is not achieved in practice. The threshold is nonetheless sharp and well-defined. The sharp rotation of the director seen in an MFT is different from the director rotation response for an aligned elastomer which deforms via semi-soft elasticity (SSE), the alternative deformation mode. In the case of semi-soft elasticity, the director rotates comparatively gradually over a plateau-like region of the tensile load curve. A theoretical plot demonstrating an SSE transition is shown in FIG. 1. The director rotates gradually across region II.

The mechanical Fréedericksz transition is measurable by applying stress in a direction perpendicular or close to perpendicular to the aligned director in a sample and tracking the orientation of the director, for example by using polarising microscopy.

Such a method comprises:
loading a strip of the elastomer into clamps of opposing actuators, placing the strip between crossed polarisers;
applying strain incrementally by imposing extension steps of 5% of the strip's initial length per minute, in a direction perpendicular to the initial director orientation;
at each extension increment, taking a series of measurements of transmitted light intensity (intensity of light transmitted through the polariser, strip and analyser), with the polariser and analyser being rotated relative to the strip by 10 degrees between each measurement.
fitting the measurements of transmitted intensity using equation $$I = I_0 \sin^2\left(\frac{b\pi \times (\theta - c)}{180}\right) + d$$

to determine c, the angle of the director relative to the direction of the applied stress (where I is the measured intensity, θ is the angle between the polariser and the fast axis of the birefringent material projected onto the plane of the polarizer, and $I_0$, b, c, and d are fitting parameters).

from the relationship between the director angle and the extension ratio, the critical extension ratio at which the elastomer undergoes the MFT can be determined—at the critical extension ratio, the director sharply rotates.

The aligned nematic elastomer preferably comprises a monodomain liquid crystal elastomer. More preferably the aligned nematic elastomer is a monodomain liquid crystal elastomer.

By "monodomain" herein is meant that the director orientation of the elastomer is macroscopically aligned in the sample. Monodomain alignment over the sample can be determined, for example, by polarising microscopy where it is characterised by uniform birefringence when the macroscopic sample is viewed between crossed polarisers.

Preferably the aligned nematic elastomer comprises a monodomain liquid crystal elastomer comprising; a polymeric component; a liquid crystal mesogen component; and a cross-linker component, wherein the liquid crystal mesogen component is physically linked to the polymeric component.

Preferably the liquid crystal mesogen component is physically linked to the polymeric component via a flexible spacer.

Preferably the flexible spacer comprises a $C_2$-$C_{10}$ alkylene group, preferably a linear $C_2$-$C_{10}$ alkylene group, more preferably a linear $C_3$-$C_7$ alkylene group, most preferably a linear $C_3$ or $C_6$ alkylene group. For example, the flexible spacer may comprise an ethylene, propylene, butylene, pentylene, hexylene, heptylene, octylene, nonylene or decylene group.

The liquid crystal mesogen component of the liquid crystal elastomer may comprise any suitable nematic mesogen.

Preferably the liquid crystal mesogen component comprises a liquid crystal core component selected from the group consisting of aromatic rings, aliphatic rings, poly aromatic rings, poly aliphatic rings, phenyls, biphenyls, benzenes, and combinations thereof.

Preferably the liquid crystal core component comprises a plurality of aromatic and/or aliphatic rings.

Preferably the liquid crystal core component is selected from one or more of the following systems:

wherein R and R' are each independently selected from the group consisting of alkyl, alkoxy, halide, —$NO_2$ or —CN and wherein the alkyl and alkoxy groups may be bivalent when forming part of the linking group which connects the liquid crystal core to the polymeric component; and X and Y are each independently selected from the group consisting of —CH═CH—, —C≡C—, —CH═N—, —N═N—, or —C(O)O—.

Preferably the liquid core component comprises at least two phenyl groups.

The phenyl groups may be optionally substituted with any suitable functional group.

Preferably at least one of X or Y is —C(O)O— or X or Y is absent.

Preferably the liquid crystal core component is selected from a 4-cyano-biphenyl-4'-yloxy, a 4-oxyphenyl 4-methoxybenzoate or a 4-oxyphenyl 4-(trans-4-propylcyclohexyl)benzoate group.

In certain embodiments the liquid crystal mesogen component is present as part of the side chain of the polymeric component, i.e. the liquid crystal mesogen component is a pendant group extending from the backbone of the polymeric component.

In certain embodiments the liquid crystal mesogen component is present as part of the backbone of the polymeric component.

The liquid crystal mesogen component may form part of both the side chain and backbone of the polymeric component.

The cross-linker component preferably comprises a bifunctional monomer having the same functionality as the polymeric component.

Preferably the cross-linker component also comprises a mesogenic component. Preferably the mesogenic component comprises a liquid crystal core component selected from one or more of the following systems:

wherein R and R' are each independently selected from the group consisting of alkyl, alkoxy, halide, —$NO_2$ or —CN and wherein the alkyl and alkoxy groups may be bivalent when forming part of the linking group which connects the liquid crystal core to the polymeric component; and X and Y are each independently selected from —CH═CH—, —C≡C—, —CH═N—, —N═N—, or —C(O)O—.

Preferably the liquid core component comprises at least three phenyl groups. Preferably at least one of X or Y is —C(O)O—.

The phenyl groups may be optionally substituted with any suitable functional group. Preferably the phenyl groups are optionally substituted with one or more C1-C3 alkyl groups, most preferably with one or more methyl groups.

Preferably the liquid core component comprises an optionally substituted bis-oxybenzoyloxybenzene group. Most preferably a bis-oxybenzoyloxy-2-methylbenzene group The polymeric component may be any suitable polymeric component. Preferably the polymeric component comprises an acrylate polymer, a vinyl polymer, a siloxane polymer, a thiol based polymer, an amine based polymer or an epoxide based polymer. Most preferably the polymeric component comprises an acrylate polymer.

In certain embodiments the polymeric component is formed from both mesogenic and non-mesogenic components.

Preferably the mesogenic components are formed from mesogenic monomers which comprise a monomer unit linked to a liquid crystal core component.

The non-mesogenic component may be a Tg reducing component. In preferred embodiments the elastomer for use according to the first embodiment of the invention has a Tg at or below room temperature (25° C.).

In preferred embodiments the Tg reducing components may be formed from monomers which comprise a monomer unit and a pendant medium chain ($C_2$-$C_{12}$) straight or branched alkyl group.

In particularly preferred embodiments the polymeric component comprises an acrylate polymer and the Tg reducing component comprises ethyl hexyl acrylate.

In preferred embodiments of the invention, the polymeric component comprises a polyacrylate, the liquid crystal core component is a 4-cyano-biphenyl-4'-yloxy component and the crosslinker component comprises a bis-oxybenzoyloxy-2methylbenzene comprising component.

The elastomer for use according to the first embodiment is preferably formed by polymerising a mixture comprising a mesogenic monomer, a crosslinking component and an initiator. The mixture may further comprise a non-mesogenic monomer to modify the properties of the final elastomer, for example to lower the Tg of the final elastomer. The mixture may also further comprise a non-reactive mesogenic component to broaden the nematic phase range prior to polymerisation. In preferred embodiments the crosslinking component also comprises a mesogenic component.

Preferably the mesogenic monomer comprises about 5-50% by mol. of the monomer mixture prior to polymerisation, more preferably about 10-30% by mol., most preferably approximately 15% by mol. In the final elastomer, the proportion of the material derived from the mesogenic monomer is preferably about 20-70% by mol., most preferably about 30-60% by mol.

Preferably the crosslinker component comprises about 1-20% by mol. of the monomer mixture prior to polymerisation, more preferably about 3-10% by mol, most preferably about 3-8% by mol. In the final elastomer, the proportion of the material derived from the crosslinker component is preferably about 5-20% by mol., most preferably about 8-17% by mol.

Preferably at least 10% of the crosslinker component comprises a mesogenic component, preferably at least 20%, at least 30%, at least 40%, at least 50%, at least 60%, at least 70%, at least 80%, at least 90% or at least 95% of the crosslinker component comprises a mesogenic component.

The initiator chosen will be dependent on the polymer used and may be any suitable initiator. However, when the polymer is a polyacrylate the initiator is preferably a photoinitiator. Possible photoinitiators are well known to those skilled in the art and include benzoin ethers, benzyl ketals, alpha-dialkoxyacetophenones, alpha-hydroxyalkylphenones, acylphosphine oxides, benzophenones and thioxanthones. Preferably the photoinitiator is methyl benzoylformate. Preferably the initiator is present in an amount of approximately 1.5% by mol. of the monomer mixture.

When a non-mesogenic monomer is present in the monomer mixture, the non-mesogenic mixture preferably comprises about 10-40% by mol. of the monomer mixture, more preferably about 15-30% by mol., most preferably about 15-20% by mol. In the final elastomer, the proportion of the material derived from the non-mesogenic monomer, if present, is preferably about 20-60% by mol, most preferably about 35-50% by mol.

When a non-reactive mesogen is present in the monomer mixture, the non-reactive mesogen preferably comprises about 10-70% by mol. of the monomer mixture, more preferably about 20-60% by mol., or 30-60% by mol., most preferably approximately 55% by mol. In preferred embodiments the non-reactive mesogen is 4-cyano-4'-hexyloxybiphenyl.

In preferred embodiments, the mesogenic monomer is 6-(4-cyano-biphenyl-4'-yloxy)hexyl acrylate, 4-methoxybenzoic acid 4-(6-acryloyloxy-hexyloxy)phenyl ester or 4-{6-(acryloyloxy)hexyloxy}phenyl 4-(trans-4-propylcyclohexyl)benzoate, the crosslinker component is 1,4-bis-[4-(6-acryloyloxyhexyloxy)benzoyloxy]-2-methylbenzene or 1,4-bis-[4-(3-acryloyloxypropyloxy)benzoyloxy]-2-methylbenzene, the non-mesogenic monomer is 2-ethylhexyl acrylate and, if present, the non-reactive mesogen is 4-cyano-4'-hexyloxybiphenyl.

In preferred embodiments, the mesogenic monomer is 6-(4-cyano-biphenyl-4'-yloxy)hexyl acrylate, the crosslinker component is 1,4-bis-[4-(6-acryloyloxyhexyloxy)benzoyloxy]-2-methylbenzene, the non-mesogenic monomer is 2-ethylhexyl acrylate and, if present, the non-reactive mesogen is 4-cyano-4'-hexyloxybiphenyl; or the mesogenic monomers are 4-methoxybenzoic acid 4-(6-acryloyloxy-hexyloxy)phenyl ester and 4-{6-(acryloyloxy)hexyloxy} phenyl 4-(trans-4-propylcyclohexyl)benzoate, the crosslinker component is 1,4-bis-[4-(6-acryloyloxyhexyloxy) benzoyloxy]-2-methylbenzene the non-mesogenic monomer is 2-ethylhexyl acrylate and, if present, the non-reactive mesogen is 4-cyano-4'-hexyloxybipheny; or the mesogenic monomers are 4-methoxybenzoic acid 4-(6-acryloyloxy-hexyloxy)phenyl ester and 4-{6-(acryloyloxy) hexyloxy}phenyl 4-(trans-4-propylcyclohexyl)benzoate, the crosslinker component is ,4-bis-[4-(3-acryloyloxypropyloxy)benzoyloxy]-2-methylbenzene, the non-mesogenic monomer is 2-ethylhexyl acrylate and, if present, the non-reactive mesogen is 4-cyano-4'-hexyloxybiphenyl.

According to a further embodiment of the invention is provided a method of producing an aligned nematic elastomer for use according to the first embodiment of the invention, said method comprising the steps of: a) applying an aligning means to a substrate b) applying the liquid crystal elastomer components to the substrate and allowing them to form an aligned nematic phase c) curing the liquid crystal elastomer components to form an aligned nematic elastomer.

Various techniques for aligning mesogenic compositions exist. For example, techniques exist to create a monodomain during synthesis, including applying a magnetic field, mechanical brushing, flow, applying an electric field, applying a thermal gradient, or providing an alignment layer or layers. The monomeric solution may also be heated, cooled or exposed to other environmental factors to influence synthesis of the monomer mixture into an aligned state.

Preferably the aligning means is an aligning force which is applied by brushing the substrate, preferably to impart a static force to the substrate.

When the crosslinking component comprises a mesogenic component and therefore may also be considered a mesogenic monomer, the ratio of mesogenic monomers to non-mesogenic monomers in the final elastomer is preferably between 2:1 and 1:1.

BRIEF DESCRIPTION OF THE DRAWINGS

Embodiments of the invention will now be described with reference to the accompanying examples and by reference to the drawings in which.

EXAMPLES

Elastomer Synthesis

Aligned nematic elastomers for use according to the invention were synthesised as follows using the following materials:
2-ethylhexyl acrylate (EHA),
6-(4-cyano-biphenyl-4'-yloxy)hexyl acrylate (A6OCB),
4-methoxybenzoic acid 4-(6-acryloyloxy-hexyloxy)phenyl ester (M1)
4-{6-(acryloyloxy)hexyloxy}phenyl 4-(trans-4-propylcyclohexyl)benzoate (M2)
1,4-bis-[4-(6-acryloyloxyhexyloxy)benzoyloxy]-2-methylbenzene (RM82),
1,4-bis-[4-(3-acryloyloxypropyloxy)benzoyloxy]-2-methylbenzene (RM257)
4-cyano-4'-hexyloxybiphenyl (6OCB) and
methyl benzoylformate (MBF).

The elastomers for use according to the invention were prepared using the following starting compositions:

| | Material % by mol | | | |
|---|---|---|---|---|
| Component | Example 1 | Example 2 | Example 3 | Example 4 |
| A6OCB | 14.6 | 24.4 | 0 | 0 |
| M1 | 0 | 0 | 15.5 | 15.3 |
| M2 | 0 | 0 | 5.6 | 5.5 |
| 6OCB | 55.9 | 54.6 | 50.0 | 50.7 |
| RM82 | 7.1 | 3.5 | 5.6 | 0 |
| RM257 | 0 | 0 | 0 | 5.3 |

-continued

| | Material % by mol | | | |
|---|---|---|---|---|
| Component | Example 1 | Example 2 | Example 3 | Example 4 |
| EHA | 20.9 | 16.0 | 22.4 | 22.3 |
| MBF | 1.6 | 1.5 | 0.8 | 0.8 |

Using a balance with an accuracy of 0.3 mg, dry materials were measured into a 4ml sample vial. The mixture was then heated to 100° C. and stirred at 60 rpm for 5 minutes. The liquid materials were added and the vial was placed on a separate stirring plate held at 40° C. and stirred at 60 rpm for a further 5 minutes.

The mixtures were then filled in the isotopic phase at 40° C. into the cells previously prepared via capillary action and left for approximately half an hour to cool to ambient temperature allowing the nematic phase to form via alignment with the rubbing direction. Once aligned, the cells were placed under a low intensity UV fluorescence light source (intensity of 2.5 mW cm$^{-2}$) for two hours to cure. Once separated from the cells, the film was washed in dicholoromethane (DCM) by slowly adding DCM stepwise to about 30% concentration. Solvents were exchanged several times to ensure all waste materials were removed before deswelling the LCE films by adding methanol stepwise. The films were left to dry fully overnight before testing.

Figure 3A:
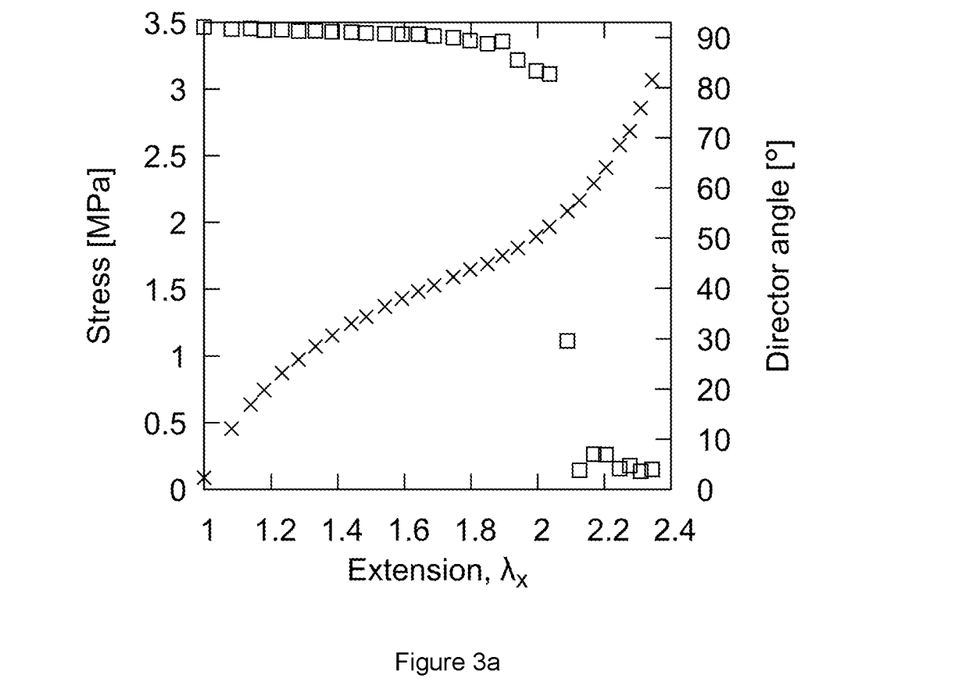
FIGS. 3a, 3b, 3c and 3d show plots of the tensile load curves and director angle response vs extension ratio for materials of examples 1 to 4 respectively.
Figure 3B:
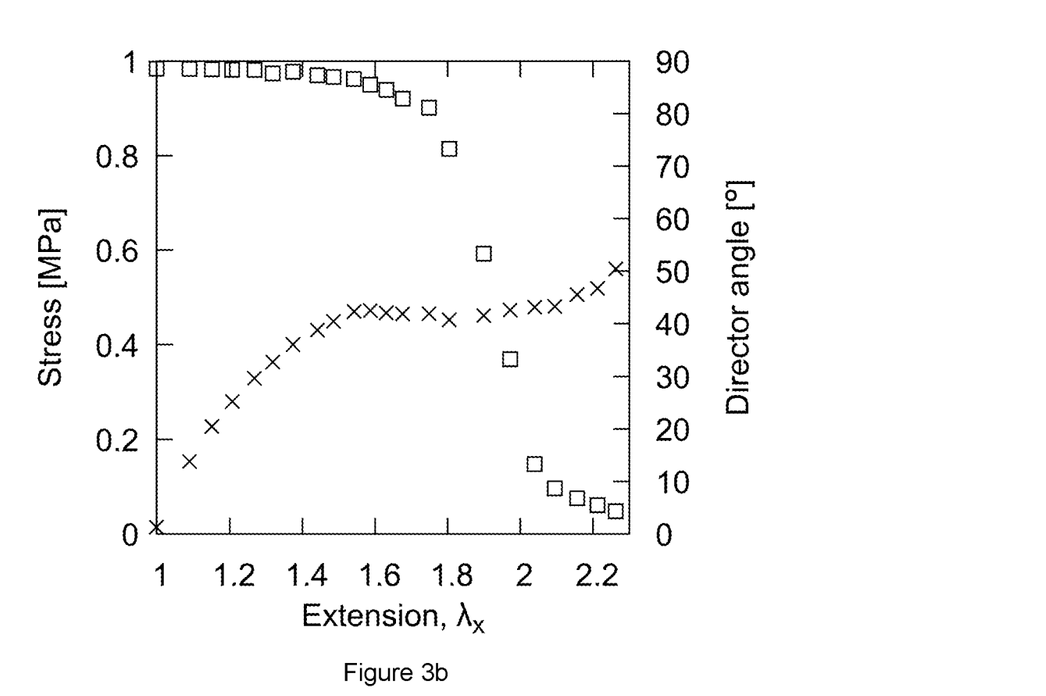
Figure 3C:
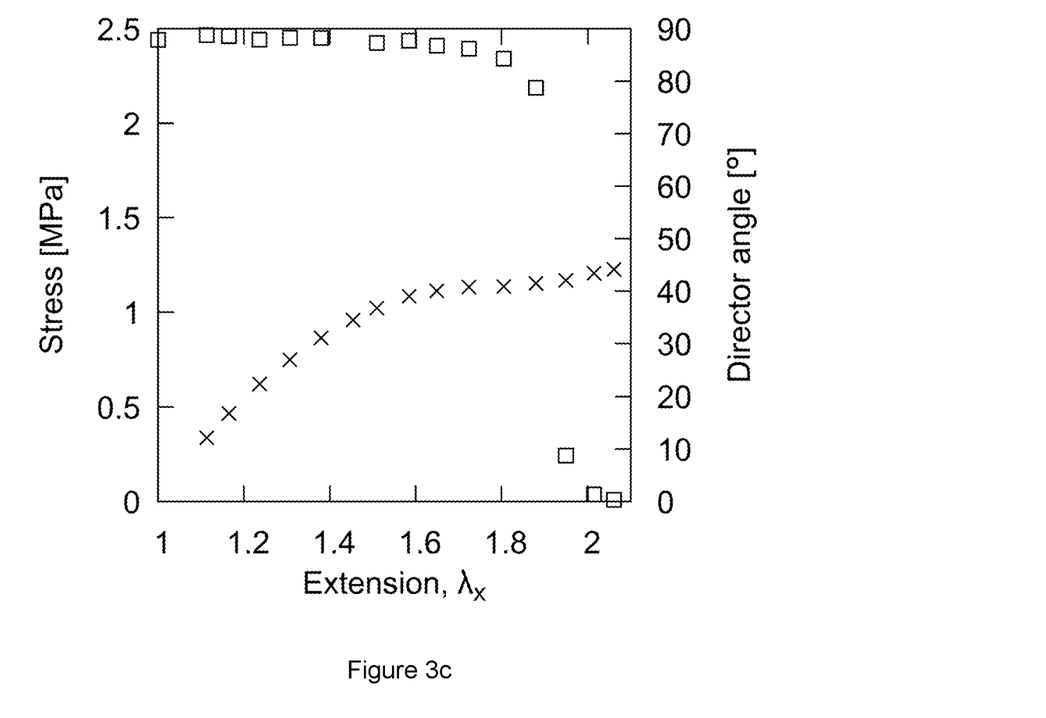
Figure 3D:
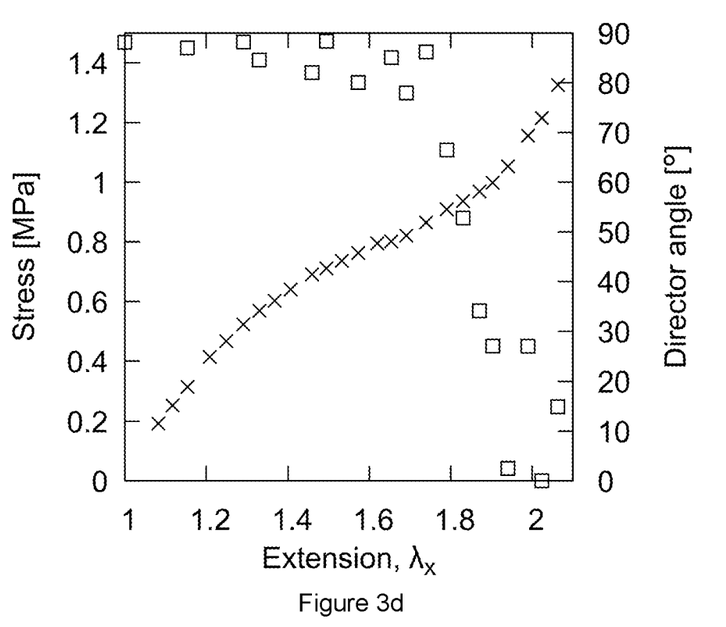
Figure 4:
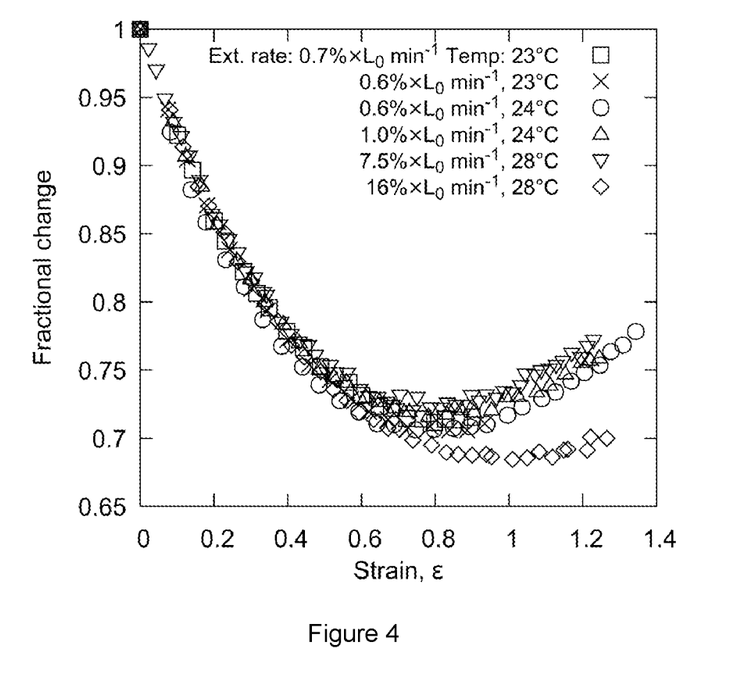
FIG. 4 shows a plot of the fractional change vs strain for the material of example 1 at varying temperature and varying extension rate.

The auxetic properties of the four materials are demonstrated in FIGS. 2a, 2b, 2c and 2d respectively which show the materials to have a negative Poisson's ratio. Beyond an extension ratio of approximately 1.8 in FIG. 2a, approximately 1.5 in FIG. 2b, approximately 1.6 in FIG. 2c and approximately 1.6 in FIG. 2d, the fractional thickness of the materials increases with increasing extension ratio. FIGS. 3a, 3b, 3c and 3d demonstrate that the materials each possess an MFT. In FIG. 3a a sharp change in director angle is seen at a strain of approximately 2.1. In FIG. 3b a sharp change in director angle is seen at an x deformation of approximately 1.9. In FIG. 3c a sharp change in director angle is seen at an x deformation of approximately 1.9. In FIG. 3d a sharp change in director angle is seen at an x deformation of approximately 1.9.

What is claimed is:
1. A synthetic aligned nematic elastomer having auxetic properties, wherein the aligned nematic elastomer has a mechanical Fréedericksz transition;
   wherein the synthetic aligned nematic elastomer comprises a monodomain liquid crystal elastomer;
   wherein the monodomain liquid crystal elastomer comprises: a polymeric component; a liquid crystal mesogen component; and a cross-linker component, wherein the liquid crystal mesogen component is physically linked to the polymeric component;
   and wherein the liquid crystal mesogen component comprises a liquid core component selected from one or more of the following systems:

-continued wherein R and R' are independently selected from the group consisting of alkyl, alkoxy, halide, NO$_2$ and —CN, and wherein the alkyl and alkoxy groups may be bivalent when forming part of the linking group which connects the liquid crystal core component to the polymeric component; and X and Y are independently selected from the group consisting of —CH═CH—, —CH═N—, —N═N—, and —C(O)O—.

2. The synthetic aligned nematic elastomer according to claim 1, wherein the auxetic properties enable the material to be used in a medical device or in a biomedical application.

3. The synthetic aligned nematic elastomer according to claim 1, wherein the auxetic properties enable the material to be used in a piezoelectric sensor or actuator, or in a micro- or nano-mechanical or electromechanical device.

4. The synthetic aligned nematic elastomer according to claim 1, wherein the auxetic properties enable the material to be used in composite materials as reinforcements, or in personal protection clothing.

5. The synthetic aligned nematic elastomer according to claim 1, wherein the polymeric component is formed from both mesogenic and non-mesogenic components.

6. The synthetic aligned nematic elastomer according to claim 1, wherein the crosslinker component comprises a mesogenic component.

7. A method of using a synthetic aligned nematic elastomer having auxetic properties in an application requiring auxetic properties, wherein the aligned nematic elastomer has a mechanical Fréedericksz transition;
wherein the monodomain liquid crystal elastomer comprises: a polymeric component a liquid crystal mesogen component and a cross-linker component, wherein the liquid crystal mesogen component is physically linked to the polymeric component;
and wherein the liquid crystal mesogen component comprises a liquid core component selected from one or more of the following systems:

wherein R and R' are independently selected from the group consisting of alkyl, alkoxy, halide, NO$_2$ and —CN, and wherein the alkyl and alkoxy groups may be bivalent when forming part of the linking group which connects the liquid crystal core component to the polymeric component and X and Y are independently selected from the group consisting of —CH═CH—, —CH═N—, —N═N—, and —C(O)O—.

8. The method according to claim 7, wherein the auxetic properties enable the material to be used in a medical device or in a biomedical application.

9. The method according to claim 7, wherein the auxetic properties enable the material to be used in a piezoelectric sensor or actuator, or in a micro- or nano-mechanical or electromechanical device.

10. The method according to claim 7, wherein the auxetic properties enable the material to be used in composite materials as reinforcements, or in personal protection clothing.

11. A method of producing a synthetic aligned nematic elastomer having auxetic properties, said method comprising the steps of:
a) applying an aligning means to a substrate
b) applying liquid crystal elastomer components to the substrate and allowing them to form an aligned nematic phase
c) curing the liquid crystal elastomer components to form an aligned nematic elastomer;
wherein the aligned nematic elastomer has a mechanical Fréedericksz transition;
wherein the synthetic aligned nematic elastomer comprises a monodomain liquid crystal elastomer;
wherein the monodomain liquid crystal elastomer comprises: a polymeric component a liquid crystal mesogen component and a cross-linker component, wherein the liquid crystal mesogen component is physically linked to the polymeric component;
and wherein the liquid crystal mesogen component comprises a liquid core component selected from one or more of the following systems:

-continued wherein R and R' are independently selected from the group consisting of alkyl, alkoxy, halide, $NO_2$ and —CN, and wherein the alkyl and alkoxy groups may be bivalent when forming part of the linking group which connects the liquid crystal core component to the polymeric component and X and Y are independently selected from the group consisting of —CH=CH—, —CH=N—, —N=N—, and —C(O)O—.

12. The method according to claim 11, wherein the aligning means is an aligning force which is applied by brushing the substrate.

\* \* \* \* \*